United States Patent
Treadway

(10) Patent No.: US 6,250,760 B1
(45) Date of Patent: *Jun. 26, 2001

(54) SILANE-BASED COATING COMPOSITION

(75) Inventor: Gerald D. Treadway, Penngrove, CA (US)

(73) Assignee: The Walman Optical Company, Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,993

(22) Filed: Aug. 20, 1999

(51) Int. Cl.$^7$ .................................................. G02C 7/02
(52) U.S. Cl. ........................................... 351/166; 351/177
(58) Field of Search ................................... 351/159, 166, 351/177

(56) References Cited

U.S. PATENT DOCUMENTS

| | | |
|---|---|---|
| 2,942,019 | 6/1960 | Pike et al. . |
| 3,166,527 | 1/1965 | Ender . |
| 3,291,775 | 12/1966 | Holm . |
| 3,591,408 | 7/1971 | Marzocchi et al. . |
| 3,837,876 | 9/1974 | Mayuzumi et al. . |
| 3,961,977 | 6/1976 | Koda et al. . |
| 3,986,997 | 10/1976 | Clark . |
| 4,027,073 | 5/1977 | Clark . |
| 4,029,842 | 6/1977 | Yoshida et al. . |
| 4,098,840 | 7/1978 | Yoshida et al. . |
| 4,196,014 | 4/1980 | Taniyama et al. . |
| 4,208,503 | 6/1980 | Martin . |
| 4,241,116 | 12/1980 | Taniyama et al. . |
| 4,426,431 | 1/1984 | Harasta et al. . |
| 4,623,676 | 11/1986 | Kistner . |
| 4,668,601 | 5/1987 | Kistner . |
| 4,719,146 | 1/1988 | Hohage et al. . |
| 4,855,180 | 8/1989 | Kawamura . |
| 4,895,767 | 1/1990 | Mori et al. . |
| 5,221,560 | 6/1993 | Perkins et al. . |
| 5,314,947 | 5/1994 | Sawaragi . |
| 5,367,019 | 11/1994 | Sawaragi . |
| 5,385,955 * | 1/1995 | Tarshiani et al. ............... 522/31 |
| 5,789,082 * | 8/1998 | Treadway ........................ 428/412 |
| 5,866,262 * | 2/1999 | Galic et al. ..................... 428/447 |

* cited by examiner

Primary Examiner—Scott J. Sugarman
(74) Attorney, Agent, or Firm—Fredrikson & Byron, PA

(57) ABSTRACT

A hard, transparent coating for eyeglass lenses and the like, derived from a blend of a hydrolysis product of an epoxy-functional alkoxysilane and an imine derivative of a hydrolysis product of an amine-functional alkoxysilane. Bodying of the coating composition to avoid mudcracking of the coating is rendered unnecessary and pot life is improved by incorporating in the coating composition a metal oxide colloid.

9 Claims, No Drawings

SILANE-BASED COATING COMPOSITION

FIELD OF THE INVENTION

This invention relates to the field of transparent coatings for transparent objects such as eyeglass lenses.

BACKGROUND OF THE INVENTION

Eyeglass lenses and other transparent plastic materials are subject to becoming dull and hazy due to scratching and abrasion during use. Polycarbonate eyeglass lenses, for example, while strong and shatter-resistant, also have relatively soft surfaces that are susceptible to scratching.

Various coatings have been proposed for eyeglasses and other transparent plastic materials to reduce their propensity to become scratched and abraded. One such composition is shown in U.S. Pat. No. 4,378,250 (Treadway et al.), granted Mar. 29, 1983. This patent shows the use of a coating composition that has two basic components, one being an at least partially hydrolyzed epoxy-functional alklyalkoxysilane and the other a derivative of an amine-substituted alkyltrialkoxysilane, also at least partially hydrolyzed. The amine component is reacted with a carbonyl compound such as a ketone to form, for example, an imine structure which stabilizes this component. The coating composition itself is formed by mixing together the two components, permitting the mixture to stand for a period of time, and then using the resulting material to coat eyeglass lenses or the like.

U.S. Pat. No. 5,866,262 (Galic et al.), granted Feb. 2, 1999, discloses a coating composition that employs two components that appear to be substantially identical to the components employed in the Treadway et al. '250 patent except that it is said that the components are fully hydrolyzed. Galic et al. explain that "fully hydrolyzed" means that the hydrolysis reaction involving the three alkoxy groups pendant from the silicon has been conducted in the presence of at least a stoichiometrically sufficient amount of water to hydrolyze all of the alkoxy groups. The Galic et al. composition requires "bodying", explained as a copolymerization reaction which occurs as the mixture of the two components is permitted to stand for a period of time. It has similarly been found that with the Treadway et al. '259 coating composition, if "bodying" is not carried out following mixing together of the two silane components, a coating of the material on a transparent substrate will tend to undergo "mudcracking" as the composition dries. Mudcracking refers to a phenomenon in which the coating itself develops a series of odd angled and completely unacceptable cracks similar in appearance to the cracked surface of dried mud flats. The appearance of mudcracking in coating compositions containing the hydrolysis products of an epoxy alkoxysilane and an imine derivative of an amino alkoxysilane does not appear to be dependent upon whether the compositions have been partially or fully hydrolyzed.

The necessary "bodying" procedure of a coating composition tends to substantially reduce the pot life of the composition—that is, the time the composition can be maintained at room temperature and optical lenses, for example, can be dipped or otherwise successfully coated with the material. If the bodying procedure could be avoided, the pot life of the coating composition could be substantially increased, and this would represent a substantial benefit by reducing the per lens cost of the coating material and reducing the frequency with which new batches of the coating composition need to be prepared.

SUMMARY OF THE INVENTION

I have found that the incorporation of one or more metal colloids in the coating composition resulting from blending hydrolyzed silane components enables the composition to be used immediately without the necessity of "bodying", and without the appearance of mudcracking in the finished product, with the result of substantially extending the pot life of the composition.

Thus, in one embodiment, the invention relates to a coating composition comprising, in an organic solvent, a curable polymer precursor comprising, as a first component, a hydrolysis product of an epoxy-functional alkoxysilane and, as a second component, an imine derivative of a hydrolysis product of an amine-functional alkoxysilane. The composition includes one or more metal oxide colloids in a sufficient concentration as to prevent mudcracking, upon drying, of a coating of said composition freshly made by blending together said components.

The metal oxide colloid of the coating composition preferably includes silica at a solids concentration in the composition of not less than about 10% by weight.

The degree of hydrolysis of the alkoxysilane components can vary substantially. Either or both of the alkoxysilane components may be hydrolyzed by a sufficient amount of water to stoichiometrically hydrolyze all or one or more of the alkoxy groups. The percent hydrolysis referred to herein refers to the ratio, in percent, of the amount of water actually used for hydrolysis to the amount of water required stoichiometrically for complete hydrolysis of all of the alkoxy groups. Degrees of hydrolysis of at least about 30% and preferably at least about 70% are preferred.

The composition may include various other components a may be desired, including other epoxy-functional monomers or oligomers.

DESCRIPTION OF THE PREFERRED EMBODIMENT

Compositions of the invention employ preferably an organic solvent, although small amounts of water may be tolerated as needed. The solvent may include a lower boiling alcohol such as a $C_1$–$C_4$ alcohol (ethanol and isopropanol being preferred), and/or a ketone such as acetone, methyl ethyl ketone, methyl propyl ketone, methyl isobutyl ketone, or mixtures thereof. Low boiling organic solvents generally are preferred because they permit a thin coating of the composition to dry quickly. In some instances, it may be desired to employ one or more higher boiling solvents for the purpose of obtaining uniform, defect-free coatings, and solvents such as the glycol ethers (e.g., propylene glycol monomethyl ether) are appropriate for this purpose.

The coating composition results from mixing together two components shortly before using the composition, and it is a feature of the composition of the invention that one may immediately use the mixture without waiting for a pre-reaction, that is, "bodying", to occur, thus extending the time that the coating composition may be used.

The first component for the coating composition comprises the partial or complete hydrolysis product of an epoxy-functional alkoxy silane and particularly the γ-glycidoxyalkyl trialkoxy silanes of which γ-glycidoxypropyl triethoxy silane is exemplary. Compounds of this type may have the formula

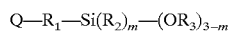

wherein $R_1$ is a $C_1$–$C_{14}$ alkylene group, $R_2$ and $R_3$ independently are $C_1$–$C_4$ alkyl groups and Q is a glycidoxy or epoxycyclohexyl group, and m is 0 or 1. During hydrolysis as discussed above, one or more of the alkoxy groups are hydrolyzed to form silanol groups with the release of an R₃—OH alcohol. Some condensation of the resulting silanol groups may occur, but epoxy reactivity is preserved. Many epoxy-functional alkoxysilanes are suitable as hydrolysis precursors, including the following: glycidoxymethyl-trimethoxysilane, glycidoxymethyltriethoxysilane, glycidoxymethyl-tripropoxysilane, glycidoxymethyl-tributoxysilane, β-glycidoxyethyltnmethoxysilane, β-glycidoxyethyltriethoxysilane, β-glycidoxyethyl-tripropoxysilane, β-glycidoxyethyl-tributoxysilane, β-glycidoxyethyltrimethoxysilane, α-glycidoxyethyl-triethoxysilane, α-glycidoxyethyl-tripropoxysilane, α-glycidoxyethyltributoxysilane, γ-glycidoxypropyl-trimethoxysilane, γ-glycidoxypropyl-triethoxysilane, γ-glycidoxypropyl-tripropoxysilane, γ-glycidoxypropyltributoxysilane, β-glycidoxypropyl-trimethoxysilane, β-glycidoxypropyl-triethoxysilane, β-glycidoxypropyl-tripropoxysilane, β-glycidoxypropyltributoxysilane, α-glycidoxypropyl-trimethoxysilane, α-glycidoxypropyl-triethoxysilane, α-glycidoxypropyl-tripropoxysilane, α-glycidoxypropyltributoxysilane, γ-glycidoxybutyl-trimethoxysilane, δ-glycidoxybutyl-triethoxysilane, δ-glycidoxybutyl-tripropoxysilane, δ-glycidoxybutyl-tributoxysilane, δ-glycidoxybutyl-trimethoxysilane, γ-glycidoxybutyl-triethoxysilane, γ-glycidoxybutyl-tripropoxysilane, γ-propoxybutyl-tributoxysilane, δ-glycidoxybutyl-trimethoxysilane, δ-glycidoxybutyl-triethoxysilane, δ-glycidoxybutyl-tripropoxysilane, α-glycidoxybutyl-trimethoxysilane, α-glycidoxybutyl-triethoxysilane, and α-glycidoxybutyl-tripropoxysilane, α-glycidoxybutyl-tributoxysilane. Particularly preferred because of its commercial availability is γ-glycidoxypropyl trimethoxysilane.

Hydrolysis of the epoxy-functional alkoxysilane precursor may be effected by adding enough water to partially or fully hydrolyze the available alkoxy groups. Normally, an approximately equal amount of water soluble alcohol, such as ethanol or methanol, is added to aid solubility and enough acid, such as hydrochloric or acetic acid, is added to lower the pH to about 4.0–4.5. The mixture is then preferably equilibrated, or ripened, for a sufficient period of time for hydrolysis, limited by the amount of water added, to occur. Volatiles, such as the volatile alcohol byproduct, may or may not be stripped off. Desirably, enough water is added to hydrolyze at least two thirds of the alkoxy groups initially present.

Various additional non-silane, epoxy-functional compounds can be employed in the composition of the invention. Appropriate glycidyl ethers include triglycidyl ether, 1,4-5butanediol diglycidyl ether, Bisphenol A diglycidyl ether, the $C_8$–$C_{14}$ alkyl glycidyl ethers, butyl glycidyl ether, cresyl glycidyl ether, phenyl glycidyl ether, nonylphenyl glycidyl ether, p-tert-butylphenyl glycidyl ether, 1,4-butanediol diglycidyl ether, neopentyl glycol diglycidyl ether, resorcinol diglycidyl ether, polyglycidyl ethers of aliphatic polyols, cyclohexane dimethanol diglycidyl ether, 2-ethylhexyl glycidyl ether, polyglycol diepoxide, polyglycidyl ether of castor oil, trimethylolethane triglycidyl ether, trimethylolpropane triglycidyl ether, and dibromoneopentyl glycol diglycidyl ether.

The second component comprises the imine derivative of the partial or complete hydrolysis product of an amine-functional alkoxysilane which may be represented by the formula

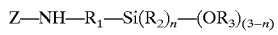

Z—NH—R₁—Si(R₂)ₙ—(OR₃)₍₃₋ₙ₎ wherein R₁ is a divalent hydrocarbon group having 1 to about 14 carbon atoms, R₂ and R₃ are selected from a monovalent hydrocarbon radical having 1 to about 4 carbon atoms, Z is a hydrogen or an aminoalkyl group, and n is 0 or 1. Preferably, the ratio of imine equivalents of the second component to epoxy equivalents of the first component is approximately 1:1, although this ratio may vary substantially, e.g., by plus or minus 20% or more, and is selected so as to provide a cured film exhibiting the desired properties.

Suitable aminoalkylalkoxysilanes useful as precursors for the second component include aminoethyl-triethoxysilane, β-amino-ethyltrimethoxysilane, β-aminoethyl-triethoxysilane, βamino-ethyl-tributoxysilane, β-aminoethyltripropoxysilane, α-amino-ethyl-trimethoxysilane, α-amionethyl-triethoxysilane, γ-amino-propyltrimethoxysilane, γ-aminopropyl-triethoxysilane, γ-amino-propyl-tributoxysilane, γ-amino-propyltripropoxysilane, β-amino-propyl-trimethoxysilane, β-aminopropyl-triethoxysilane, β-amino-propyltripropoxysilane, β-aminopropyl-tributoxysilane, α-amino-propyl-trimethoxysilane, α-aminopropyl-triethoxysilane, α-aminopropyl-tributoxysilane, α-amino-propyl-tripropoxysilane, N-aminomethylaminoethyl-trimethoxysilane, N-aminomethylaminomethyl-tripropoxysilane, N-aminomethyl-β-aminoethyl-trimethoxysilane, N-aminomethyl-β-aminoethyl-triethoxysilane, N-aminomethyl-β-aminoethyl-tripropoxysilane, N-aminomethyl-γ-aminopropyl-trimethoxysilane, N-aminomethyl-γ-aminopropyl-triethoxysilane, N-aminomethyl-γ-aminopropyl-tripropoxysilane, N-aminomethyl-β-aminopropyl-trimethoxysilane, N-aminomethyl-β-aminopropyl-triethoxysilane, N-aminomethyl-β-aminopropyl-tripropoxysilane, N-aminopropyltripropoxysilane, N-aminopropyl-trimethoxysilane, N-(β-aminoethyl)-β-aminoethyl-trimethoxysilane, N-(β-aminoethyl)-β-aminoethyl-triethoxysilane, N-(β-aminoethyl)-β-aminoethyl-tripropoxysilane, N-(β-aminoethyl)-β-aminoethyl-trimethoxysilane, N-(β-aminoethyl)-α-aminoethyl-triethoxysilane, N-(β-aminoethyl)-α-aminoethyl-tripropoxysilane, N-(β-aminoethyl)-β-aminopropyl-trimethoxysilane, N-(β-aminoethyl)-γ-aminopropyl-triethoxysilane, N-(β-aminoethyl)-γ-aminopropyl-tripropoxysilane, N-(β-aminoethyl)-γ-aminopropyl-trimethoxysilane, N-(β-aminoethyl)-γ-aminopropyl-triethoxysilane, N-(β-aminoethyl)-β-aminopropyl-tripropoxysilane, N-(γ-aminopropyl)-β-aminoethyl-trimethoxysilane, N-(γ-aminopropyl)-β-aminoethyl-triethoxysilane, N-(γ-amininopropyl) β-aminoethyl-tripropoxysilane, N-methyl aminopropyl trimethoxysilane, β-aminopropyl methyl diethoxysilane, γ-diethylene triamine-propyltriethoxysilane. A particularly preferred aminoalkylalkoxysilane precursor is γ-aminopropyl triethoxy silane due to its wide commercial availability.

Hydrolysis of the aminoalkoxysilane similarly takes place by the reaction of water with the alkyloxy groups attached to the silicon atom. As with the epoxy-functional component, the amine functional component commonly has two or three alkoxy groups bonded to silicon. The imine derivative—desirably a ketimine—may be formed by reacting the amine group with a stoichiometric excess of a ketone such as methyl ethyl ketone, and the imine derivation can be performed either before or after hydrolysis of the amine component.

A variety of metal oxide colloids and colloid mixtures may be employed in the coating compositions of the invention, including oxides of antimony, zirconium, cerium, tin, and silicon, silica being the preferred colloid. The concentration of colloid in the final coating composition can be varied as appropriate to reach the desired result of forming a coating composition that is immediately useable without "bodying". Colloid concentrations of 10% or more (solids basis) are preferred. Although I do not wish to be bound to the following explanation, I currently think that the colloid ingredient acts to some extent as a filler to avoid mudcracking caused by rapid shrinkage resulting from the simultaneous effects of solvent evaporation and rapid epoxy/amine reaction.

The colloid may be contained in either or both of the components of the coating composition, and good results have accrued from incorporation of the colloid ingredient in the component containing the epoxy-functional silane hydrolysis product. Varying of the metal oxide colloid ingredients (type and amount) enables one to vary the refractive index of the resulting coating and thereby match it to the refractive index of the underlying substrate, such as polycarbonate, to avoid interference fringes. Reference is made to U.S. Pat. No. 5,789,082 (Treadway), the teachings of which are incorporated herein by reference.

The invention may be more clearly understood by reference to the following non-limiting examples.

EXAMPLE 1

Base Resin Preparation

To 236.0 g of γ-glycidyoxy propyl trimethoxy silane (containing three equivalents of —O—CH$_3$) was added 36 g (2 moles) of water and 0.3 g of 5% hydrochloric acid. The composition was permitted to stir overnight. The degree of hydrolysis thus was two-thirds, or 66.7%. The resulting material was labeled "Base Resin A".

To 221.4 g of γ amino propyl triethoxysilane (containing three equivalents of —O—C$_2$H$_5$) was added 36 g (2 moles) of water, and the resulting solution was stirred overnight to enable hydrolysis to occur. The degree of hydrolysis thus was two-thirds, or 66.7%. The resulting material was labeled "Base Resin B".

EXAMPLE 2

Preparation of Components

First Component:

Four different compositions, labeled 1A, 1B, 1C and 1D were prepared by combining the following ingredients in a glass vessel, stirring overnight at room temperature, and adjusting the pH to a level of 8.0–8.5 with 10% ammonium hydroxide, all amounts being in grams:

| Ingredient | 1A | 1B | 1C | 1D |
|---|---|---|---|---|
| Base Resin A | 27.2 | 27.2 | 27.2 | 6.8 |
| Trimethylol propane triglycidyl ether | 5.1 | 0.0 | 0.0 | 11.2 |
| Cyclohexane dimethylol diglycidyl ether | 0.0 | 5.1 | 5.1 | 0.0 |
| Colloidal silica, 30% by weight in isopropanol | 45.1 | 45.1 | 10.0 | 35.2 |

Second Component:

To Base Resin B was added methyl ethyl ketone in the amounts given in the following table to form the ketimine derivative, all amounts being expressed in grams.

| Ingredient | 2A | 2B | 2C | 2D |
|---|---|---|---|---|
| Base Resin B | 17.1 | 17.1 | 17.1 | 12.9 |
| methyl ethyl ketone | 94.3 | 94.3 | 94.3 | 65.0 |

Use and Testing

Four different coating solutions A, B, C and D were produced by mixing together compositions 1A and 2A described above to form coating composition A, mixing together compositions 1B and 2B to form coating composition B, etc. The coating compositions were used immediately after mixing them together, without waiting for "bodying" to occur. The compositions were coated on polycarbonate lenses by dipping the lenses into the compositions, permitting them to drip dry, and then heating them for 1.5 hours at 120° C. The resistance of the thus prepared coatings to scratching or abrasion was measured using a Taber Abrader, a product of Byk-Gardner. Abrasion resistance testing with this equipment may be performed in accordance with ASTM D 1044-78. Testing of the thus prepared coatings with a model 5130 Taber Abrader equipped with abrasive wheels weighted at 500 g yielded the following results, the numbers referring to the percentage haze of the lenses and "cycles" referring to the number of revolutions of the lens under the weighted wheel:

| Taber Abrasion | A | B | C | D |
|---|---|---|---|---|
| 200 Cycles | 6.5% | 5.9% | 6.7% | 2.4% |
| 500 Cycles | | | | 5.0% |

All of the coatings A, B, C and D, when viewed under a microscope, were clear and free from "mudcracking".

EXAMPLE 3

A completely hydrolyzed Base Resin A was prepared by blending together 236 g of γ-glycidyoxy propyl trimethoxy silane (containing three equivalents of —O—CH$_3$), 54 g (3 moles) of water, and 695 g of colloidal silica (30% by weight in isopropanol), the mixture being stirred for about 18 hours.

A completely hydrolyzed Base Resin B was prepared by blending together 221.4 g of γ-glycidyoxy propyl trimethoxy silane (containing three equivalents of —O—CH$_3$) and 54 g (3 moles) of water, stirring the mixture for about 18 hours, and then adding 118 g of methyl ethyl ketone to form the ketamine derivative.

To 100 g of Base Resin A was added 20.2 g of Base Resin B, 17 g of methyl ethyl ketone, and 0.25 g of a flow control agent (FC-430, 3M Company), to form the completed coating composition. The composition was immediately (without bodying) coated by spin coating on polycarbonate lenses, and was cured in a forced air oven for 1.5 hours at 120° C. The cured coatings were free of mudcracking or other blemishes. When abrasion tested as in Example 2, the percent haze was measured as 3% after 200 cycles and 6% after 500 cycles. Adhesion of the coating to the polycarbonate substrate was measured using adhesion test ASTM 3359, which involves scoring the cured coating in a cross-hatched fashion, and then attempting to pull cross-hatched portions of the coating away from the substrate using a pressure sensitive adhesive tape. Adhesion was measured at 100%, meaning that none of the coating was removed.

EXAMPLE 4

To 680 g of the Base Resin of Example 1 were added 100 g of trimethylol propane triglycidyl ether and 335 g of colloidal silica (30% by weight in isopropanol). The mixture was stirred overnight and then combined with 500 g a colloidal mixture of titania, $SnO_2$ and zirconia (30% by weight in methanol, "HIT 32M", a trademarked product of Nissan Chemical.

The resulting first component was blended with a second component containing 198 g of the Base Resin B of Example 1 to which had been added 183.9 g of methyl ethyl ketone. The resulting coating composition was used immediately, that is, without "bodying", by spin coating the composition onto polycarbonate lenses followed by curing at 120° C. for 2 hours. Abrasion testing as in Example 1 yielded a haze of 3.2% after 200 cycles and 6.1% after 500 cycles, and adhesion, tested as in Example 3, was 100%. The cured coating exhibited no interference fringe.

EXAMPLE 5

A first coating component is prepared by combining 63.9 g of the Base Resin A of Example 1 (66.7% hydrolysis) with 93.9 g of trimethylol propane triglycidyl ether and 295.8 g of colloidal silica (30% by weight in isopropanol). The mixture is stirred overnight at room temperature, the pH is adjusted to 8.0–8.5 with 10% $NH_4OH$, and the resulting material is divided into three equal aliquots designated 1A, 1B and 1C.

Three different second component formulations, designated 2A, 2B and 2C, are prepared by combining Base Resin B of Example 1 with methyl ethyl ketone, as follows:

| Ingredient | 2A | 2B | 2C |
|---|---|---|---|
| Base Resin B | 37.2 g | 29.7 g | 40.9 g |
| Methyl ethyl ketone | 99.8 g | 93.7 g | 110.0 g |

Components 1A and 2A are mixed to form a coating composition A, and components 1B and 1C are mixed respectively with components 2B and 2C to form respective coating compositions B and C. The ratio of epoxy equivalents to imine equivalents of composition A is 1/1, of composition B is 1.2/1, and of composition C is 1/1.1. The coating compositions are used immediately upon mixing, without bodying, and are coated on polycarbonate lenses as in Example 2, followed by heating in a forced air oven for 2 hours at 120° C. Taber abrasion testing yields the following results:

| Composition | 200 Cycles | 500 Cycles |
|---|---|---|
| A | 2.4% | 5.0% |
| B | 4.1% | 9.6% |
| C | 2.0% | 4.5% |

EXAMPLE 6

Glycidoxypropyl trimethoxysilane (30 g) was combined with 19.7 g of cyclohexane dimethanol diglycidyl ether, 23.3 g of a suspension of colloidal silica in isopropanol at 30% solids, 4.6 g of water and 0.4 g of 5% HCl, the resulting composition being labeled Base A. Aminopropyl triethoxysilane (221 g) was combined with 36 g. of water, the resulting composition being labeled Base B. Base A (10 g) was combined with a blend of 3.4 g of Base B and 8.3 g of methyl ethyl ketone to form a coating composition. Lens coating was performed as in Example 2, without bodying, on polycarbonate lenses, the coatings being cured for one-half hour at12° C. and 5 hours at 90° C. The resulting coatings were free from mudcracking, and were subjected to tintability and abrasion testing, yielding the following results:

| Tintability: | 25% transmission |
|---|---|
| Taber abrasion (200 cycles) | 8.8% haze. |

While preferred embodiments of the invention have been described, it should be understood that various changes, adaptations and modifications may be made therein without departing from the spirit of the invention or the scope of the appended claims.

What is claimed is:

1. A coating composition in an organic solvent comprising a blend of a first component comprising a hydrolysis product of an epoxy-functional alkoxysilane and a second component comprising an imine derivative of a hydrolysis product of an amine-functional alkoxysilane, said composition including a metal oxide colloid in sufficient concentration as to prevent mudcracking upon drying of a coating made from a fresh blend of said components without bodying.

2. The coating composition of claim 1 wherein said metal oxide colloid is silica at a solids concentration in said composition of not less than about 10%.

3. The coating composition of claim 1 wherein said metal oxide colloid is a mixture of metal oxide colloids.

4. The coating composition of claim 1 wherein said epoxy-functional alkoxysilane is γ-glycidoxypropyl trimethoxysilane.

5. The coating composition of claim 1 wherein said amine-functional alkoxysilane is -aminopropyl triethoxy silane.

6. The coating composition of claim 1 wherein the degree of hydrolysis of at least one of the components is at least ⅔.

7. The coating composition of claim 1 wherein the degree of hydrolysis of at least one of the components is 100%.

8. An eyeglass lens having a surface bearing a coating derived from the coating composition of claim 3 wherein the index of refraction of said coating is essentially equal to the index of refraction of said lens.

9. Method for providing a transparent substrate with a transparent coating free from mudcracking, comprising, as a first step, blending together a hydrolysis product of an epoxy-functional alkoxysilane, an imine derivative of a hydrolysis product of an amine-functional alkoxysilane, and a metal oxide colloid, to form a coating composition, and, immediately after said first step and without bodying, coating said substrate with said coating composition, and heat-curing said coating.

* * * * *